United States Patent
Saha et al.

(10) Patent No.: US 11,475,385 B2
(45) Date of Patent: *Oct. 18, 2022

(54) METHOD AND SYSTEM FOR UTILITY POWER LINE MONITORING

(71) Applicant: Green Grid Inc., San Ramon, CA (US)

(72) Inventors: Chinmoy Prosun Saha, San Ramon, CA (US); Jeffrey Scott Pickles, Sunnyvale, CA (US)

(73) Assignee: Green Grid, Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/506,897

(22) Filed: Oct. 21, 2021

(65) Prior Publication Data

US 2022/0108242 A1 Apr. 7, 2022

Related U.S. Application Data

(63) Continuation of application No. 16/951,213, filed on Nov. 18, 2020, which is a continuation-in-part of
(Continued)

(51) Int. Cl.
*G06Q 10/06* (2012.01)
*G08B 17/00* (2006.01)
(Continued)

(52) U.S. Cl.
CPC ......... *G06Q 10/0635* (2013.01); *B63B 35/00* (2013.01); *B64C 39/024* (2013.01);
(Continued)

(58) Field of Classification Search
CPC ......... G06Q 10/0635; G06Q 10/06315; G06N 20/00; G06V 20/185; B63B 35/00; G64C 39/024; H04N 7/185
See application file for complete search history.

(56) References Cited

U.S. PATENT DOCUMENTS 9,784,836 B2 * 10/2017 Heinonen ............... G01S 17/89
9,913,003 B2    3/2018  Lloyd et al.
(Continued)

FOREIGN PATENT DOCUMENTS

CN    201331816 Y  * 10/2009
CN    103049739 A    4/2013
KR    102144974 B1   8/2020

OTHER PUBLICATIONS

Li, et al.: "Advances in Vegetation Management for Power Line Corridor Monitoring Using Aerial Remote Sensing Techniques," 2010 1st International Conference on Applied Robotics for the Power Industry (2010).
(Continued)

*Primary Examiner* — Rutao Wu
*Assistant Examiner* — Stephen S Swartz
(74) *Attorney, Agent, or Firm* — Harness Dickey & Pierce PLC

(57) ABSTRACT

The present invention solves a very complex problem that is a major obstacles for electric utility industry's power lines vegetation encroachment management business. Vegetation contacts to the high voltage overhead power lines cause flash-over and/or blackout which results in hazardous situations and economic losses. Power line vegetation management is a very cost intensive business process which is essential to ensure safe, reliable and affordable electric energy supply by the electric utilities, transmission and generation owners. This routine electric utility vegetation management related work is mandated and overseen by applicable federal, state or local regulatory agencies. The state-of-the-art vegetation management process involves labor and cost intensive foot-patrol, vehicular patrol, air patrol and airborne LiDAR patrol of power lines. These methods are often inefficient, unreliable, risky and costly. The present invention provides a method and system for
(Continued)

automated vegetation growth, condition and status monitoring near high voltage utility electric lines using stationary sensors, wireless or wired communications and computation technologies and proprietary algorithms. The method and system of the current invention monitors the power line infrastructures remotely and advises the vegetation maintenance crews on mitigating actions without requiring human interventions, thus saving cost and reducing risks to the humans and environment. A comprehensive vegetation encroachment condition report with vegetation proximity advisory (VPA) and vegetation resolution advisory (VRA) is automatically generated and transmitted to the operational staff by the system for each electric line span at certain time interval or continuously without boots-on-the-ground manual asset inspection and/or air patrol using aircraft. This current invention is an automated, safer and low-cost solution to an electric utility industry's essential reliability and compliance related business process.

30 Claims, 13 Drawing Sheets

Related U.S. Application Data application No. 15/330,978, filed on Jun. 11, 2017, now Pat. No. 10,880,623.

(60) Provisional application No. 62/348,950, filed on Jun. 12, 2016.

(51) Int. Cl.
| | | |
|---|---|---|
| G08B 21/10 | (2006.01) | |
| G08B 29/20 | (2006.01) | |
| G06T 7/20 | (2017.01) | |
| G08B 21/16 | (2006.01) | |
| G06Q 50/16 | (2012.01) | |
| G06Q 40/08 | (2012.01) | |
| G06Q 50/26 | (2012.01) | |
| G06N 20/00 | (2019.01) | |
| B64C 39/02 | (2006.01) | |
| B63B 35/00 | (2020.01) | |
| B64F 1/36 | (2017.01) | |
| G01S 17/89 | (2020.01) | |
| H04N 7/18 | (2006.01) | |
| G06V 20/10 | (2022.01) | |

(52) U.S. Cl.
CPC .............. *B64F 1/362* (2013.01); *G01S 17/89* (2013.01); *G06N 20/00* (2019.01); *G06Q 10/06315* (2013.01); *G06Q 40/08* (2013.01); *G06Q 50/163* (2013.01); *G06Q 50/265* (2013.01); *G06T 7/20* (2013.01); *G06V 20/188* (2022.01); *G08B 17/005* (2013.01); *G08B 21/10* (2013.01); *G08B 21/16* (2013.01); *G08B 29/20* (2013.01); *H04N 7/185* (2013.01); *B64C 2201/12* (2013.01)

(56) References Cited

U.S. PATENT DOCUMENTS

| 10,032,267 | B2* | 7/2018 | Strebel | G01S 7/4802 |
| 10,127,449 | B2* | 11/2018 | Pestun | G08G 5/0013 |
| 10,212,495 | B2 | 2/2019 | Lloyd et al. | |
| 10,880,623 | B2 | 12/2020 | Saha et al. | |
| 2011/0266011 | A1* | 11/2011 | Lee | A62C 3/0271 |
| | | | | 169/52 |
| 2012/0029871 | A1 | 2/2012 | Spillane | |
| 2012/0046799 | A1* | 2/2012 | Alex | G01R 15/142 |
| | | | | 700/298 |
| 2012/0169498 | A1* | 7/2012 | Leppanen | G06V 20/188 |
| | | | | 702/2 |
| 2014/0136379 | A1* | 5/2014 | Smith | G08B 29/00 |
| | | | | 705/34 |
| 2014/0164306 | A1* | 6/2014 | Datta | G06T 17/05 |
| | | | | 706/46 |
| 2014/0176702 | A1* | 6/2014 | Davis | H01R 4/28 |
| | | | | 348/135 |
| 2014/0177928 | A1* | 6/2014 | Bangay | G06V 20/182 |
| | | | | 382/113 |
| 2014/0211005 | A1* | 7/2014 | Dow | G01C 5/00 |
| | | | | 356/4.01 |
| 2015/0131079 | A1* | 5/2015 | Heinonen | G06Q 10/0631 |
| | | | | 356/4.01 |
| 2016/0229533 | A1* | 8/2016 | van Cruyningen | B64C 31/024 |
| 2016/0292312 | A1 | 10/2016 | Saha et al. | |
| 2016/0299229 | A1* | 10/2016 | Heinonen | G01S 17/86 |
| 2017/0052222 | A1* | 2/2017 | Pasdar | H01H 47/00 |
| 2018/0098137 | A1* | 4/2018 | Saha | G06Q 10/06316 |
| 2020/0293773 | A1* | 9/2020 | Loveland | G06V 20/188 |
| 2020/0334904 | A1 | 10/2020 | Chang et al. | |
| 2021/0073692 | A1* | 3/2021 | Saha | G06Q 10/20 |

OTHER PUBLICATIONS

General Order 95 Section 11113 California Public Utilities Commission (2012).
English translation of CN 103049739-A (2013).
Kurinsky, Brian: "Power Line Corridor Vegetation Management: Clearing a Path to Reliable Electric Service using LiDAR," Theses Presented to the Department of Humanities and Social Services in Candidacy for the Degree of Master of Science, Northwest Missouri State University, Maryville, MO (Oct. 2013).

* cited by examiner

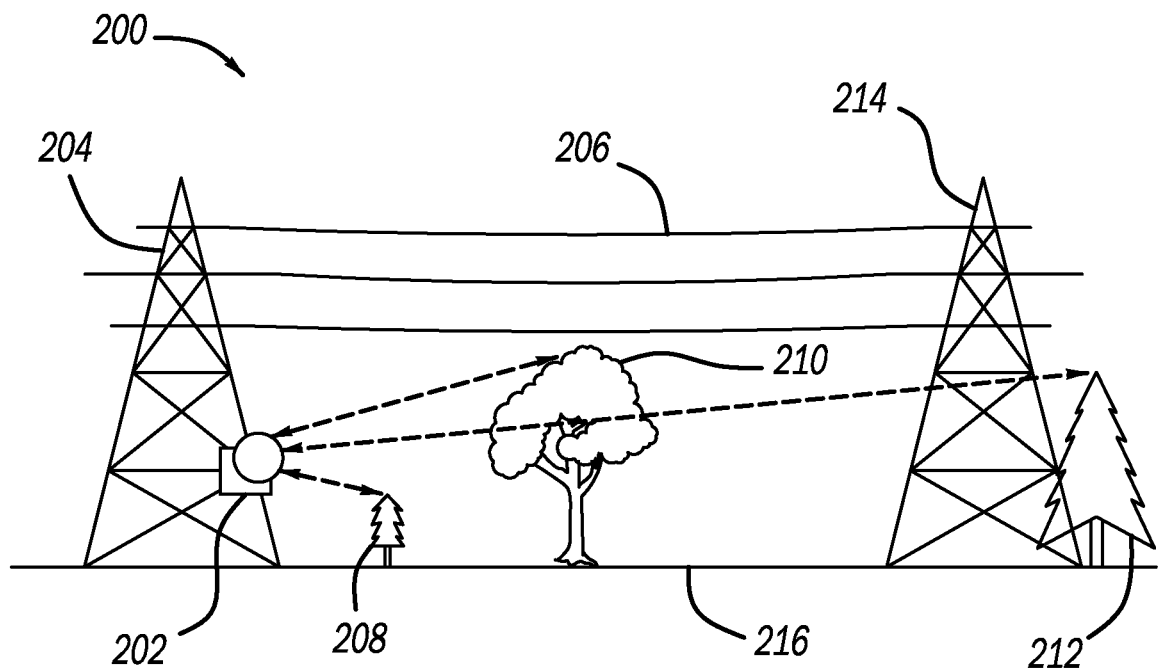
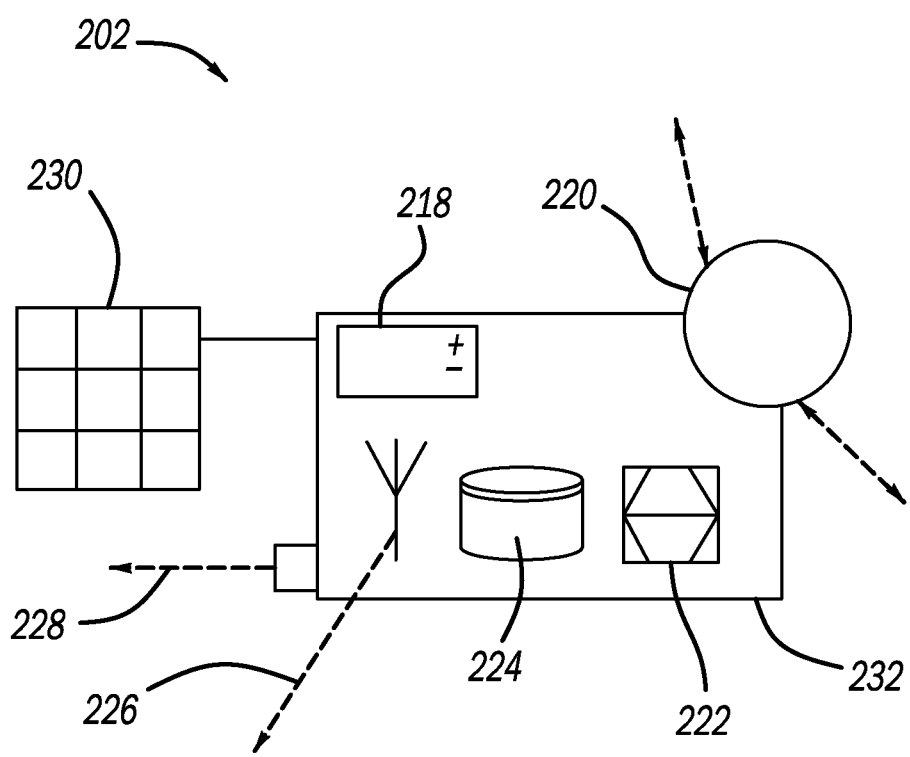
Fig. 2

302

Sensor packages are installed on power poles, transmission towers or other structures to collect, process and transmit data. The sensors collect one or more of visual images, video, infrared, LIDAR, RADAR, multi-spectral, hyper-spectral, range finder.

304

The sensor package automatically collects data to calculate the size and location of electric lines, terrain, structures and vegetation.

306

Sensors have a field of view and range that allows for the entire tower, pole, lines, right of way, ground to be imaged with sufficient overlap to the next span. This can be accomplished with 1 or more sensors per power structures arranged in various configurations or with moving or rotating sensors or by sensor pairs providing stereo sensing. This provides 100% coverage of the ROW.

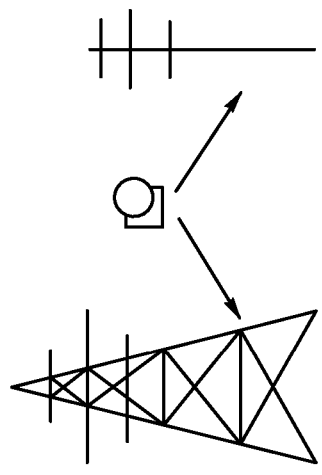 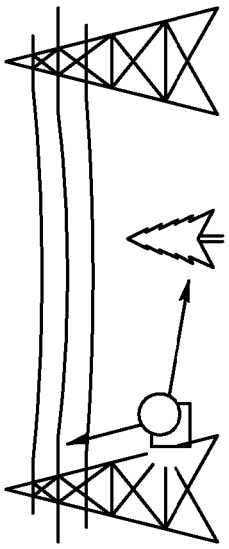 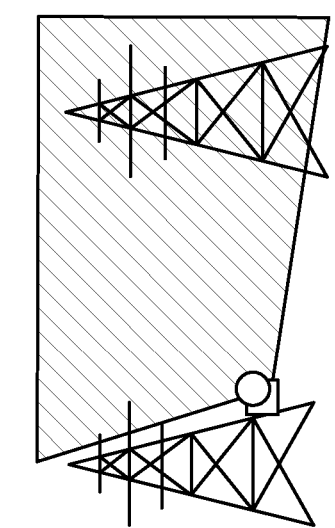

*Fig. 3A*

308
After each sensor scan, the ground, structures, power lines and vegetation are identified and measured. The vegetation is compared to pre-defined zones based on MVCD. Power lines' wind sway, ambient temperature, wind speed, power line load and sag are considered in this real time calculation. No operating condition modeling is required. VPA VRA are automatically calculated for each span. For each PA and RA vegetation is identified by a unique number.

310
PA and RA are updated after each scan and made available over the internet to users. Vegetation management personnel respond to PA and RA as required. The data is collected and stored locally or sent to a server via a wireless or wired network for storage and management. The data includes the images and sensor data and GPS data and other meta data such as tower ID and tree ID.

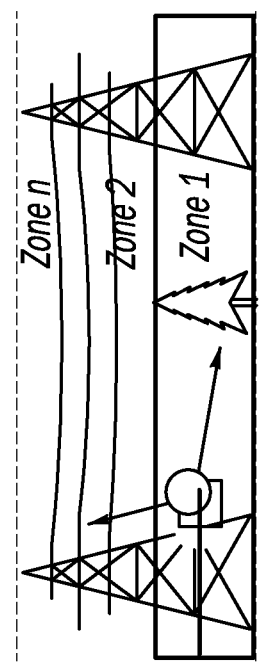
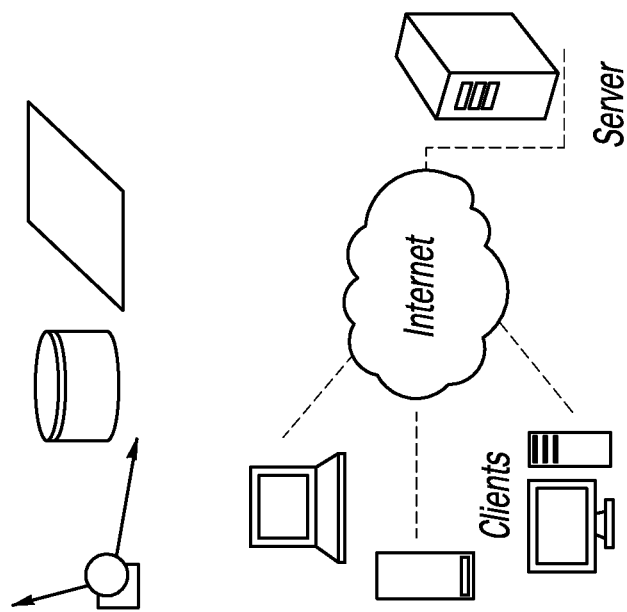

*Fig. 3B*

METHOD AND SYSTEM FOR UTILITY POWER LINE MONITORING

RELATED APPLICATIONS

The present application is a continuation of U.S. patent application Ser. No. 16/951,213 filed on Nov. 18, 2020, which is a continuation-in-part of U.S. patent application Ser. No. 15/330,978 filed on Jun. 11, 2017 (now U.S. Pat. No. 10,880,623), which claims priority to the U.S. Provisional Patent Application Ser. No. 62/348,950 filed on Jun. 12, 2016, all of which are incorporated by reference herein.

BACKGROUND

Electric utility overhead transmission (bulk and local systems) and distribution power lines/wires/conductors are carried on metallic and nonmetallic towers and poles across very long distances in many directions which include metropolitan, urban, suburban and rural areas. Vegetation/trees from the surroundings can potentially encroach in to the overhead high voltage (4 kilo volt [kV] and above) electric lines, eventually contacting or striking these lines. These vegetation encroachment events may bring the energized lines down to the ground, ignite surrounding vegetation and cause unscheduled electric service disruptions (blackouts). These hazards are amplified in drought seasons when dead trees in the proximity of the utility power lines could fall over these high voltage electric conductors and start wildfire. The utilities and/or power lines maintenance companies need to cyclically inspect these power lines to monitor and assess vegetation conditions and mitigate hazards from potential vegetation encroachments. Based on the vegetation condition inspection findings, the power line vegetation maintenance crews cut/trim or remove vegetation/trees that reach a threshold proximity to the power lines as predefined by the relevant regulatory agencies and utility companies. There are federal, state, regional, and local level regulatory agencies to oversea this vegetation management compliance process in the United States. A few examples of such regulatory agencies and their applicable vegetation management regulations in the United States are, North American Electric Reliability Corporation (NERC) FAC-003-04, California Public Utilities Commission (CPUC) General Order (GO) 95 and California Fire Department (CAL Fire) Public Resource Code (PRC) 4292 and 4293 etc. The regulatory agencies and the utility companies within their jurisdictions have developed required minimum vegetation clearance distance (MVCD) parameter for these lines based on the rated line voltages, minimum ground to conductor clearance (MGCC) requirements, geographic locations and their compliance inspection cycles. The maximum allowable vegetation height (MAVH) under or around high voltage power lines right-of-way (ROW) is mainly controlled by the MGCC and required MVCD parameters. The utility vegetation management line of business must ensure compliance to this MVCD requirements for the electric lines that they own or maintain. The This electric transmission and distribution vegetation management is a mandatory compliance process that electric utility companies (investors owned, publicly owned or privately owned), Transmission Owners (TO) and Generation Owners (GO) must carry out to ensure safe, reliable and affordable electricity supply to their customers and prevent any hazards to the environment from potential vegetation related flash-over hazards and resulting blackouts. Noncompliance to these regulations may impose steep fines and other punishments to the responsible utility companies, TO or GO.

The state-of-the-art power lines routine and non-routine patrolling process for vegetation management is a manual, tedious and costly process which involves rigorous boots-on-the-ground or foot patrolling by large inspection crews round the year. Routine patrol is cyclical and non-routine process is scheduled as need to cover requirements of special programs such as integrated vegetation management, tower or pole vegetation clearance management, emergency condition such as drought related vegetation management etc. Many crews patrol these electric lines by driving their motor vehicles and/or walking where no accessible road is available in and out of an electric lines right-of-way (ROW) under these routine and non-routine utility vegetation management programs. According to the applicable regulations, certain electric utility companies have to inspect hundred percent of their electric lines they own even though some portions of the total line length or spans (span is comprised of two subsequent towers or poles of a contiguous electric transmission or distribution line) may not have any vegetation in their proximities (wire zone and non-wire zone) that can possess any hazards by encroaching to a line (grow in to or fall in to). This foot patrol process imposes extra hazards to the inspectors in heavily wooded rugged terrains. This is a wasteful and risky process that being practiced by the electric utility industry for decades. A safer, more efficient and automated method of vegetation condition inspection is required for the electric utilities power lines vegetation management. Electric lines are counted in the unit of line miles. An electric utility company may own from a few to thousands of line miles of overhead electric transmission and/or distribution lines depending on its service territory and number of customers it serves. In certain geographic service areas in the United States an electric utility company may be responsible to manage several millions of trees along their overhead transmission and distribution electric lines right-of-way (ROW). In this situation total number of trees may be translated into a unit based quantity such as number of trees per line mile. No vegetation to a few thousand trees per line mile are not unusual for a large electric utility company in the United States.

In another state-of-the-art approach, aerial patrol of the electric lines for vegetation condition and encroachment detections is conducted by a pilot and an inspector from an aircraft flying over the electric transmission lines. This is a visual inspection method that requires flying two personnel over the electric lines in certain intervals to complete the cyclical inspections. A rotorcraft (helicopter) needs to fly at a lower altitude (about 400 feet to 500 feet above ground level [AGL]) in order to assess the vegetation condition and encroachment visually from the rotorcraft by the vegetation management inspection crew. This method is costly, creates loud engine noise in the neighborhood and faces objections from the utility customers in habitable areas. In addition, flying such close distance to the high voltage transmission lines is hazardous to the people and property.

In another recent approach, airborne sensor-based patrol method using light detection and ranging (LiDAR) technology is used by a few utility companies for their vegetation management compliance inspection process. While this approach introduces certain degrees of remote sensing and process automation, this is inefficient for this particular application because it involves frequent aircraft flights over the power lines that run in many different directions in relatively shorter segments. This directional variation and segmentation of the power lines forces the LiDAR scan and data collection aircraft to unnecessarily fly over the areas that do not have any power lines because of practical maneuverability of the sensor carrying aircraft. In addition, airborne LiDAR survey do not produce real time information about the vegetation proximity around the power lines. Therefore, this monitoring process must be accomplished frequently every year. This is a costly effort. A large portion of the transmission line length of an electric utility company may not have vegetation along the ROW. In aerial LiDAR-based inspection method, the sensors have to fly over those vegetation free line lengths each year to comply with the cyclical inspection requirements in absence of a real-time power line vegetation monitoring system and method. The vegetation proximities to a power line at the time of LiDAR sensor flight do not capture the minimum possible proximities due to the higher conductor sag at the maximum operating load condition (amperage) and blow-out due to higher wind gust than the flying condition. Extensive modeling of the power line sage due to the load variations (to the maximum operating load condition), ambient temperatures and wind speed and direction variations are required to predict vegetation proximity situations at maximum load condition for each power line which must be compared with the line specific MVCD to determine required vegetation controlling measures. This method is a tedious process because it involves extensive manual data processing and modeling after each airborne LiDAR scan cycle. The time lapse between the successive scans and data processing is excessive which fails to accurately capture the actual growth of a tree within this time lapse. As a result, a required MVCD compliant tree from a scan cycle may grow taller enough to exceed the MVCD and become noncompliant during the time lapse between the successive scan. This kind of vegetation clearance noncompliance risk is higher in certain geographic and environmental regions such as riparian or orchard zones where tree growth rate along ROW is very high (e.g. about 20 feet/year). Airborne LiDAR survey cannot flag these special climatic regions without extensive manual post processing of native survey data. Therefore, the airborne LiDAR-based vegetation management process for the utility power lines involving a very large number of LiDAR scanning flights each year and extensive data processing is a huge waste of time and financial resources and threat to the environment.

Despite the aforementioned stat-of-the-art approaches to manage vegetation, most of the electric utilities frequently report vegetation related power outages. The severity of damages from the electric transmission line power outages due to the vegetation encroachment is relatively higher than distribution line power outages. Vegetation encroachment related damage of a transmission line can cause cascading power outage across the power grid of a very large geographic area or even of the entire nation causing billions of dollars of economic damages. Therefore, an alternative approach is necessary for this highly critical compliance application of the utility power lines vegetation management which is more accurate, reliable, efficient, safer and cost effective.

Thus, there remains a heartfelt need for an improved system and method in which the utility power lines vegetation management process can protect the nation's critical power infrastructures, human lives, properties and environment with higher reliability, accuracy and efficiency.

SUMMARY OF THE INVENTION

This current invention uses stationary visual and/or tactical sensor-based remote sensing, computing technologies and proprietary machine vision and machine learning algorithms over wireless and/or internet communication network system to automatically detect and measure vegetation proximity to the high voltage power lines and advise maintenance crews to trim/cut or remove vegetations/trees that reach a predefined threshold proximity to the high voltage utility power lines. This current sensor-based vegetation monitoring and controlling invention is a more efficient and cost effective alternative to the state-of-the-art utility power lines vegetation compliance management processes. This invention issues vegetation proximity advisory (VPA) and vegetation resolution advisory (VRA) to the electric utility vegetation management crews based on the proprietary machine learning and artificial intelligence algorithms without needing any human field power line vegetation inspectors. The power lines infrastructures such as towers, poles and conductors are in geospatially static environment which is favorable for monitoring these infrastructures remotely using this current invention. The stationary sensors may be capable of optical imaging, electromagnetic sensing or sonic sensing across wide range of spectrum including but not limiting to, red green blue (RGB) visual band, infrared (IR), multispectral (MS), Hyper-spectral (HS), light detection and ranging (LiDAR), radio detection and ranging (RADAR), synthetic aperture radar (SAR) or ultrasonic. These sensors consume low power which may be provided using integrated batteries and/or solar power source. Single or multiple sensors of different types can be used per power lines tower or pole to monitor vegetation encroachments. The sensors can be programmed for continuous and/or intermittent monitoring of the surroundings at certain spatial and temporal intervals. Based on the sensor observation over discrete time steps around a power line surrounding location the system estimates vegetation relative location and construct map of the environment using the connected and/or cloud computing system. The map output is geometrically accurate as well as topological representation of the relative distances among the objects of interest. The computation method considers slow growing movement of vegetation and relatively faster movement of conductors due to occasional high wind blow-out and applies effective digital filters to reduce any bias and measurement noise. The computation results provide vegetation proximity advisories to the end users via connected devices such as personal computers, laptop computers, tablets and mobile/cellular phones. Whenever a vegetation proximity reaches a predefined critical or potential hazard threshold distance to a power line, the system will issue the appropriate VPA and VRA for that particular location based on spatial situation of the georeferenced sensor. The end users (vegetation management or control crews) can take necessary actions based on the automatic advisory issued by this invention. This method and system requires one time installation of the sensor packages to the power lines poles/towers which can last for many years without frequent maintenance and/or replacement. The year round cyclic inspections of the power lines by foot patrolling, air patrolling or LiDAR sensor equipped aircraft flying are eliminated by this current invention. Hence, this current invention is a safer, more efficient and cost effective system and method of electric utility power lines vegetation management.

In one embodiment, this invention uses a stationary remote sensing sensor package that is attached/mounted on an electric transmission tower/pole to monitor surrounding vegetation encroachment within the critical zones along a ROW. Each sensor package is geospatially oriented as survey control points in standard spatial coordinate reference system using horizontal and vertical datum. The georeferencing system adds important additional geographic information such as riparian climatic region, national forest region, orchard region of the sensor package location when applicable. This sensor's viewing range and field of view (FOV) will cover an entire line span to the next tower after this host tower within the same span. Similarly, the subsequent line spans will be monitor by the sensors mounted on the subsequent towers. This method involves producing classified point clouds in three dimension (3D) and or image classification in spatial coordinates from geographically oriented and georeferenced images acquired from the tower mounted sensors and applying novel algorithms for extracting features and calculating location, height and 3D distance of vegetation segments from the subject electric transmission lines. The system provides VPA or VRA to the designated utility vegetation management personnel depicting the proximity of trees to the subject lines and suggested actions through the wired or wireless communication network in predefined temporal resolutions. The vegetation management personnel take necessary mitigation actions according the VPA or VRA received from a georeferenced sensor. The fidelity of a VPA or VRA will mostly depend on the sensor resolution and accuracy.

In another embodiment, this invention uses multiple stationary remote sensing sensor packages that are mounted on each electric transmission tower/pole to monitor surrounding vegetation encroachment within the critical zones along a ROW from multiple directions. This sensor's viewing range and field of view (FOV) will cover an entire line span to the next tower after this host tower. Similarly the subsequent line spans will be monitor by the sensors mounted on the subsequent towers. This method involves producing classified point clouds in three dimensional (3D) and or image classification in spatial coordinates from geographically oriented and georeferenced images acquired from the tower/pole mounted sensors and applying novel algorithms for extracting features and calculating location, height and 3D distance of vegetation segments from the subject electric transmission lines. The system provides VPA and VRA to the designated utility vegetation management personnel depicting the proximity of vegetation to the subject lines through the wired or wireless communication network in predefined temporal resolutions. The vegetation management personnel take necessary mitigation actions according the VPA or VRA received from the georeferenced sensors.

In another embodiment of this invention, the stationary sensor packages remotely monitor and report vegetation growth within predefined zones around the utility power line towers and poles. This reporting is used to maintain vegetation clearance around the towers and poles.

In another embodiment, this invention enables utility vegetation management personnel to remotely assess health condition of vegetation in a ROW.

Many other features and advantages of the present invention will be realized by those skilled in the art upon reading the following description, when considered in conjunction with the drawings, in which:

BRIEF DESCRIPTION OF THE DRAWINGS

FIG. 2 illustrates a set of exemplary functional data acquisition and processing and communication equipment in a typical utility power line span to implement one of the embodiments of the present invention.

FIGS. 3A and 3B illustrate a diagrammatic presentation of the sequential steps performed in the automated image data processing in accordance with the present invention.

DETAILED DESCRIPTION OF THE DRAWINGS

Figure 1:
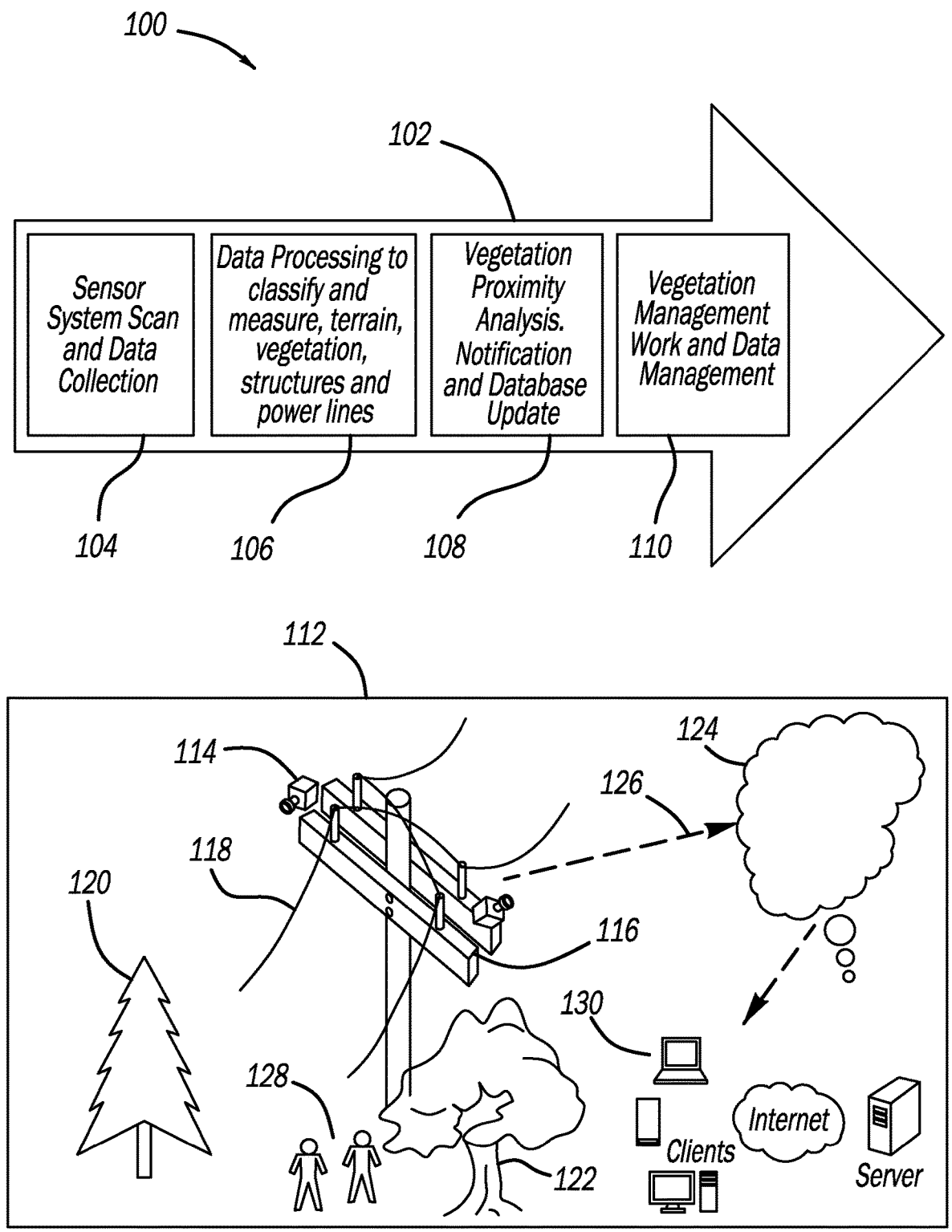
FIG. 1 illustrates a graphical overview of the system and method organized to implement embodiments of the present invention.

Directing attention to FIG. 1, there is shown the steps and functional components of the embodiments of the present invention, 100. The workflow diagram, 102 illustrates the main steps, 104, 106, 108 and 110 in the system. The sensor package continuously, periodically, intermittently or based on an event scans in step, 104 for electric wires, transmission towers, power poles, terrain, vegetation and structures along the span of the electric lines. Single or multiple sensors with fixed or adjustable zoom and field of view (FOV) are installed on each power pole or tower. The sensor package and installation provide 100% scan coverage of the electric utility ROW. The sensor package images and data are processed in step, 106 in situ or sent to the cloud computing platform for processing. Image data is classified to delineate and measure 3D objects such as electric power structure, lines, vegetation and ground. In case of a visual sensor, shapes in the point clouds can be aligned at each observation instant with image registration. Following this processing step, the vegetation proximity analysis, 108 compares the 3D vegetation and distance-to-wire measurements to the required MVCD and issues applicable notifications (VPA or VRA) to the end users for each vegetation and in a span. Finally in step, 110 vegetation management crews perform work and record the results on the portable device and sync the work completion record back to the vegetation management system database.

The graphical representation of the system in, 112 where one or more sensor package(s), 114 are attached to a power pole/tower or structure, 116. The sensor package includes visual or tactical type of sensors. The sensor packages capture images/range data and meta data to measure the location and dimensions of power lines, 118 and vegetation, 120 and 122 and determine proximity to power lines, 118. The sensor package images and data are processed onboard the senor package, 114 or sent to the cloud, 124 over wireless or wired network, 126. The vegetation proximity results are sent to the end users, 128 over the internet to their desktop or mobile devices, 130. Vegetation management teams and tree trimming crews, 128 use the vegetation proximity measurements information and advisories on their devices, 130 to schedule, perform and manage vegetation maintenance work as required.

In one embodiment of the present invention where the end users, 128 with devices, 130 select the area of interest or highest priority vegetation proximity notifications, and downloads the GIS maps with vegetation data to the local drive of the portable device to be available if the device, 130 is used outside of wireless networks. Vegetation crews perform tree work and record the results on the portable device and sync the results data back to the system after completion. This data sync process updates the VPA and VRA for the entire system to allow resources to be directed to the next highest priority area for vegetation management work to be scheduled by location and travel logistics in concert.

Directing attention to FIG. 2, there is shown generally an electric power line and transmission tower environment, 200 in which embodiments of the present invention operates. The sensor package, 202 attached to the power pole or tower or structure, 204 to automatically observes and collect image, spatial and weather data including, visual digital images, video, infrared (IR), LiDAR, RADAR, Sonar, range finder, multi-spectral, hyper-spectral, range, global positioning system (GPS) longitude, latitude, wind speed, ambient temperature, altitude, date and time which are associated with the data. Collected imageries of electric wires, 206, vegetation, 208, 210, 212 and surrounding power poles, towers or structures, 214 and terrain, 216 are processed automatically to produce the required information including, classified images, measurements of power lines, power poles or transmission towers, terrain, vegetation, proximity analysis, 2D map, 3D map, VPA and VRA using proprietary methods and algorithms of the present invention. The common vegetation, 208, 210 and 212 may include ash, black oak, blue, casuarinas, cottonwood, cypress, deodar, Douglas fir, eucalyptus, gray pine, incense cedar, live oak, oak, palm, ponderosa pine, as well as other pine and deciduous species and brushes/bushes which can pose encroachment related risks to the transmission and distribution lines. The wires, 206 types generally include, Aluminum Conductor Steel Reinforced (ACSR), All Aluminum Alloy Conductor (AAAC), Aluminum Conductor Self Supporting (ACSS) or copper conductors.

In one embodiment, the sensor package, 202 uses a digital camera or infrared or multi-spectral or hyper-spectral sensors. Multiple georeferenced aerial images of a ROW are acquired with specific overlap to be used with photogrammetric tools and techniques to produce colorized high density point cloud and surface mesh. The range or depth of an observed object is interpolated based on the lens disparity of this stereoscopic camera system. In another embodiment, the sensor package, 202 uses a LiDAR sensor and optional digital camera to acquire georeferenced raw LiDAR data and optional photograph to produce colorized point could. The range or depth of an observed object is directly calculated based on the velocity of light in this method. In another embodiment, the sensor package, 202 includes a digital camera and range finder. This sensor package interprets pictures and tactical range data to produce VPA and VRA using proprietary machine vision and learning algorithms. In another embodiment the sensor package, 202 uses a range finder which scans the horizontal plane of the maximum allowed tree height of a span. When a tree grows up to the plane of maximum allowable tree height then the VPA or VRA notification is issued for that span automatically. This simplified tactical sensor-based system reduces the computational burden, data storage size and cost of the sensor package. These embodiments can be used in various combinations and in any of these embodiments the data is stored in local storage and/or upload to the cloud system for onsite or remote processing. The data transmission includes LAN/PAN/WAN/Wi-Fi/Cell/802.1/FTP protocols. The sensor package, 202 includes general features and functions such as rechargeable battery system, 218 with battery management sub systems to ensure long battery life, the sensor lens, 220, one or more of active and passive visual or tactical sensors such as digital camera in the visible spectrum to acquire pictures and video, infrared (IR) camera, range finder, multi-spectral sensor, hyper-spectral sensor, LiDAR sensor, RADAR, Sonar, embedded microprocessor image processing engine, 222, data storage such as hard drive, removable media storage, 224, wireless antenna such as Wi-Fi, Bluetooth, cellular phone, 226, wired data connection such as USB, Ethernet, RS232 serial communications, Modbus, CAN bus, analog or digital inputs or outputs and solar panel, 230 to charge the battery system and waterproof rugged enclosure, 232 for year round outdoor use.

Directing attention to FIGS. 3A and 3B, there is shown generally a flow chart, 300 of automated vegetation proximity data collection and processing in which embodiments of the present invention operate. One or more sensor packages are installed on one or more power pole(s)/tower(s) or structure(s) per span, 302. In the data collection and data analysis process, 304 automatically collect location and shape of objects within a power line span.

In one embodiment the sensor packages, 306 has an adjustable FOV. A wide angle (greater than 90 degrees) FOV enables image collection of nearby vegetation and the base of the power pole or tower to which the sensor package is attached. A medium or narrow field of view enables high resolution imaging of vegetation, power lines, terrain and structures at a distance greater than the distance to the next power pole or tower, thus creating a system with 100% coverage of all the power lines, structures, terrain and vegetation within a span. This arrangement is replicated for each span to cover the entire power line system.

In the flow chart step, 308 proprietary algorithms and off-the-shelf image and data processing tools are used to classify and measure power lines, vegetation, terrains and structures. After each measurement the objects are counted and compared to pre-defined zones and buffers as dictated by the applicable MVCD. The wind speed and resulting power lines wind sway (blow-out), line load and ambient temperature and resulting power line sag are automatically captured in this real-time scan and computations without any intensive manual modeling. The scan frequency and time step can be adjusted to as often as needed or based on significant weather events such as before or after a storm, events of high wind speed, rain and lightning. VPA and VRA are automatically generated for each span following any observations/scans.

In vegetation proximity data transfer and management process, 310 results of the analysis, 308 are the data and maps generated by this present invention which is distributed among the users using one of the embodiments. The current and historical results are transmitted over a wired or wireless network to the client server system. In another embodiment of 310 the raw sensor data and images are transmitted by a wired or wireless network to the server system which performs the image processing and production of analysis products which are sent to the end users. These embodiments allow for installation and operation of this system in areas with high bandwidth wireless networks, in areas with lower bandwidth wireless networks or without any preexisting wireless networks by creating a new wireless network with each sensor package as needed.

Figure 4:
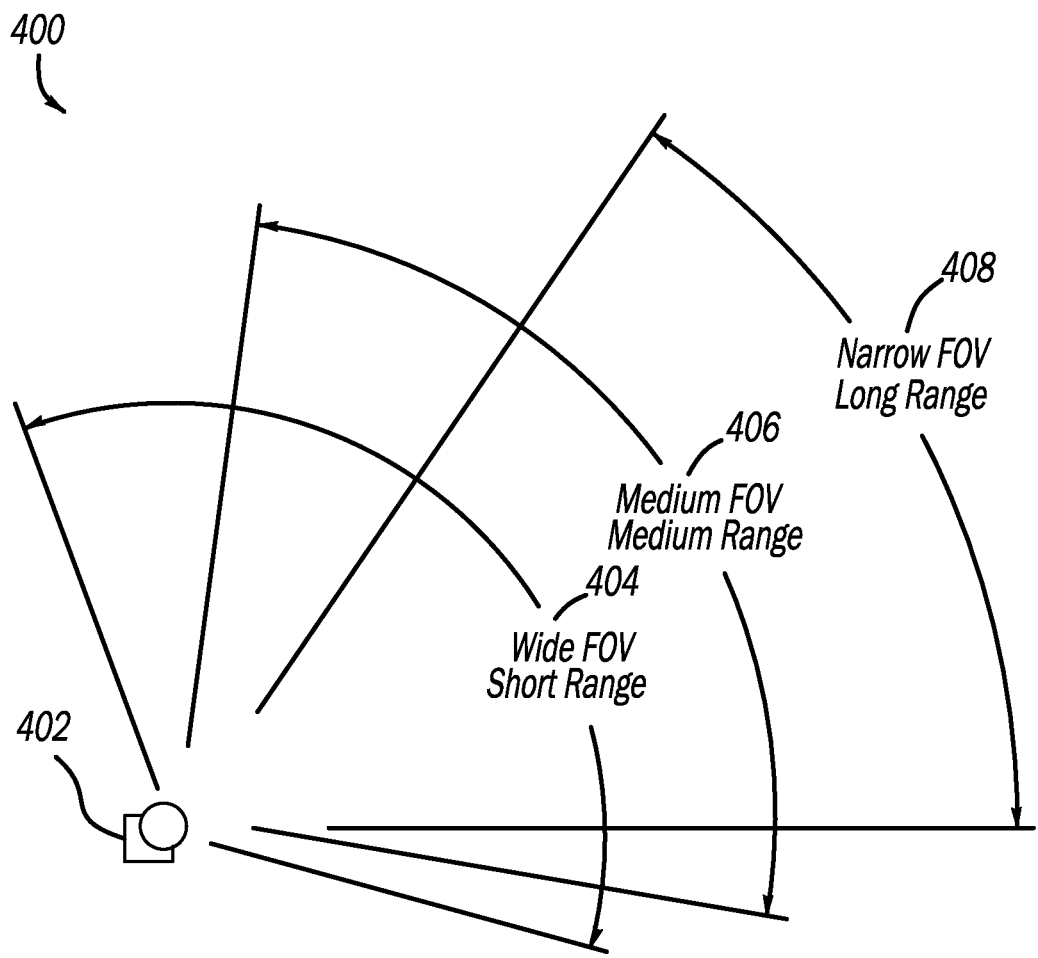
FIG. 4 illustrates imaging sensor field of view range and sensing efficacy to implement one of the embodiments of the present invention.

Directing attention to FIG. 4, there is shown generally the sensor package with adjustable FOV, 400. The sensor package, 402 scans and collects images of multiple fields of view for each collection scan to maintain good resolution and complete coverage. The sensor FOV is remotely adjustable and programmable to automatically collect multiple scans of multiple FOVs for each line span. When the wide FOV, 404 is used, the FOV is greater than 90 degrees allowing for a fish eye effect to collect a wide footprint and provide coverage of nearby vegetation and the electric lines and structure to which the sensor package is attached. When the medium FOV, 406 is used, the sensor range is increased while the footprint and coverage will overlap with the wide FOV to ensure complete coverage. When the narrow FOV setting, 408 is used, the range is increased and the coverage will overlap with the medium FOV to ensure complete coverage.

Figure 5:
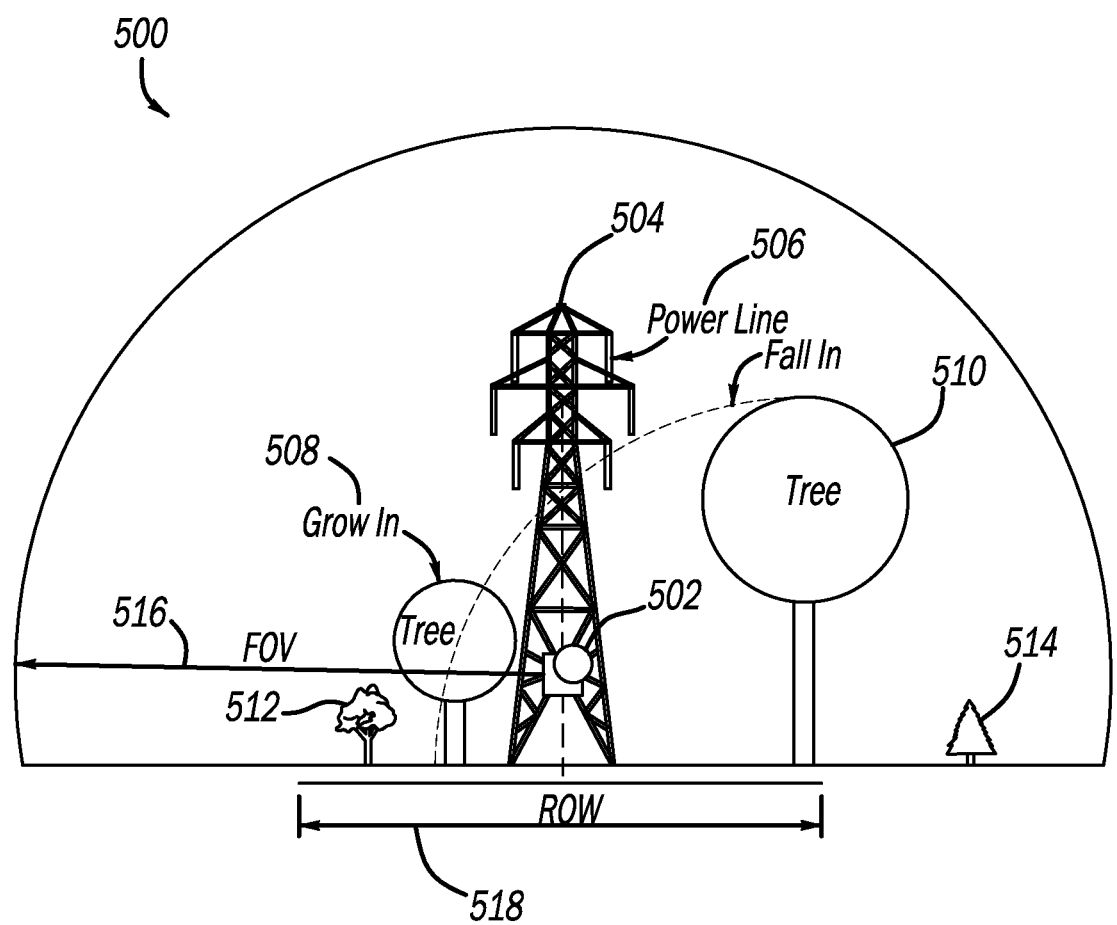
FIG. 5 illustrates exemplary images of vegetation proximity detection categories along utility power lines in accordance with the present invention.

Directing attention to FIG. 5, there is shown the end view of an electric transmission line ROW, 500. The sensor package, 502 is installed on transmission tower, 504. Power lines, 506 and trees 508, 510, 512 and 514 are within the sensor package FOV, 516. All the vegetation/trees, 508, 510, 512 within the electric ROW, 518 and vegetation and trees, 514 outside the ROW, 518 are within the sensor FOV, 516. This arrangement allows for the proposed invention to accurately identify and measure all vegetation encroachment threats including those that may grow up in to the power lines, 508 and those which may fall in to the power lines, 510.

Figure 6:
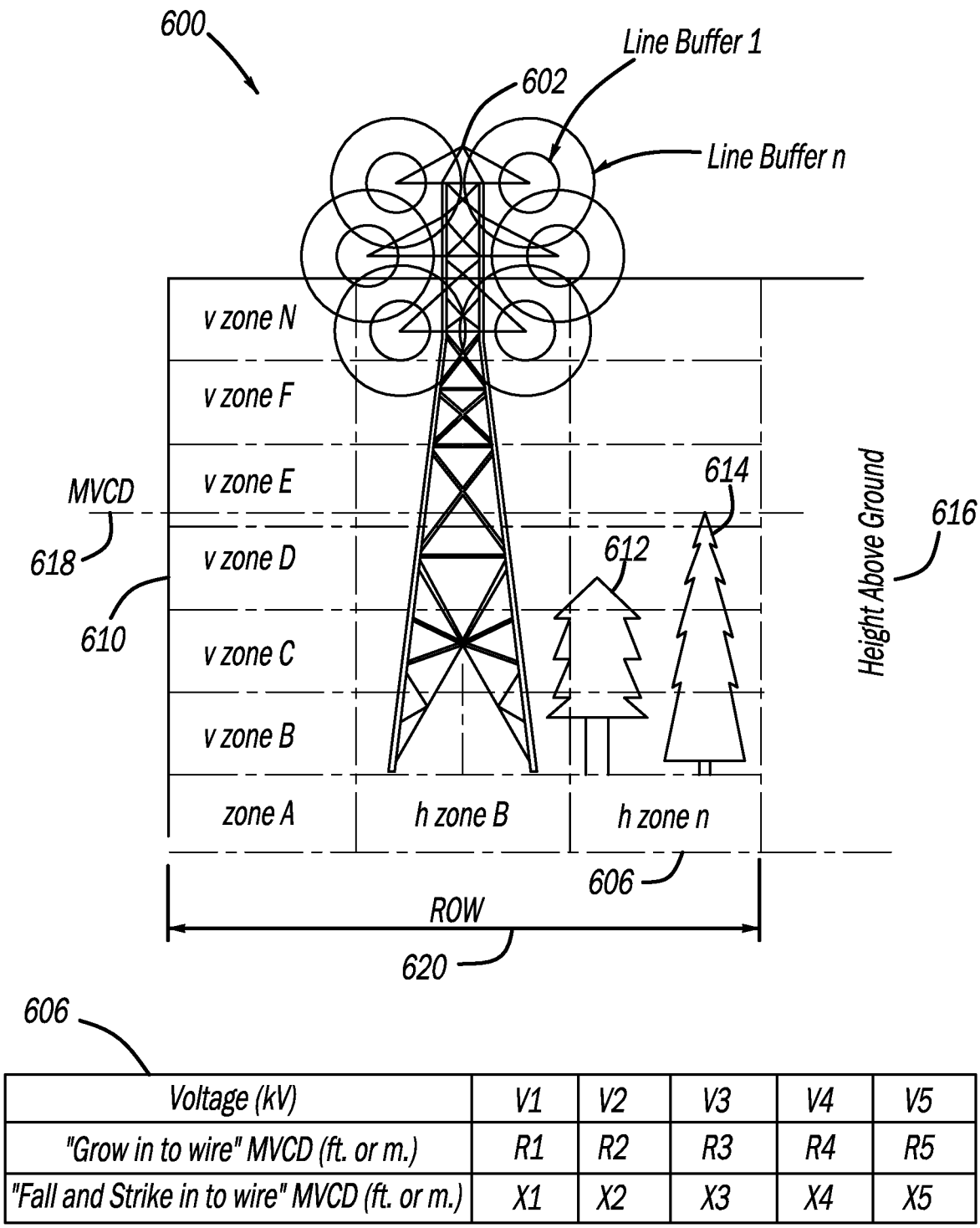
FIG. 6 illustrates vegetation proximity detection criteria and schema along the power lines in accordance with the present invention.

Directing attention to FIG. 6, an example of the vertical and horizontal zones and buffers around a set of power lines are shown with trees to describe the vegetation detection criteria, 600. The transmission tower, 602 has multiple power lines of a circuit. Each line is assigned multiple rings of buffers, 604 based on the line voltage and required MVCD. The MVCD for each line is defined by the regulatory agencies and adopted by the utilities. An example schema of MVCD for different line voltages is shown in table, 606. The horizontal zones, 608 and the vertical zones, 610 are defined for grow-in and fall-in tree detection based on the MVCD. These zones are adjusted for the terrain within each span to account for flat and sloped terrains. The tree, 612 occupies a set of multiple zones and the tree, 614 occupies a different set of multiple zones. Both of these trees, 612 and 614 is assigned unique identification numbers, GPS coordinates in latitude and longitude and optometric height above ground, 616, canopy radius and type/species. In this example, 600, the tree, 614 height is reaching the MVCD threshold. Therefore, the system will automatically issue a VRA for the tree crews to accomplish tree clearance action. The tree, 612 height is less than the MVCD. Therefore, the system will automatically issue a VPA to the vegetation management personnel for information only.

Figure 7:
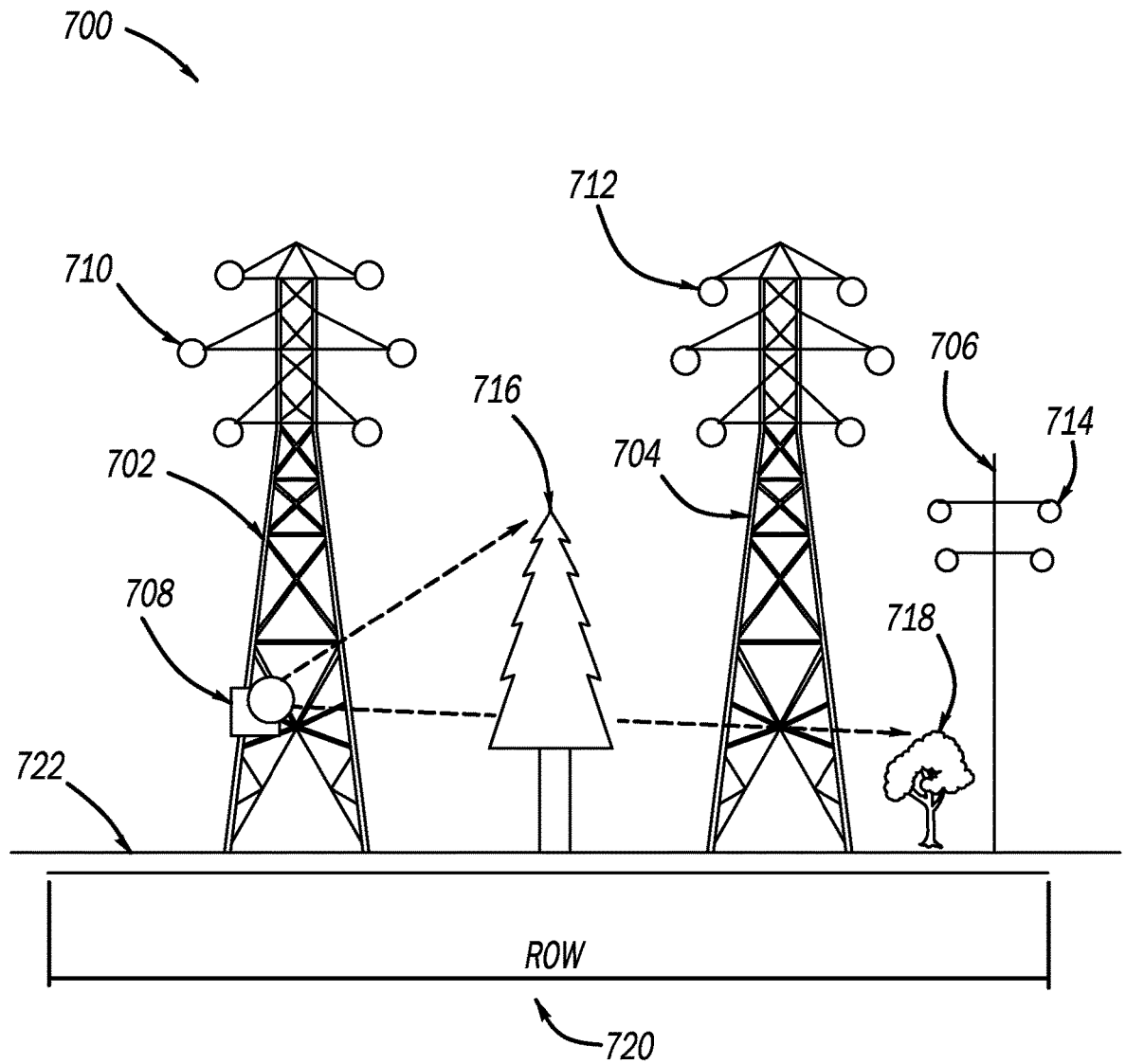
FIG. 7 illustrates a situation where multiple transmission circuits and distribution circuits share a single corridor and vegetation proximity detection criteria and determination schema along the multi-circuit power lines in accordance with the present invention.

Directing attention to FIG. 7, an embodiment of the current invention wherein an end view of a single electric utility corridor/ROW, 700 with multiple transmission towers, 702 and 704 and an under build distribution pole, 706 are shown. Here the sensor package, 708 is installed on tower, 702 to be able to image all electric wires, 710, 712 and 714, the vegetation, 716 and 718 and structures, 704 and 706 within the ROW, 720 and is able to detect and measure vegetation distances between the transmission and distribution lines.

Figure 8:
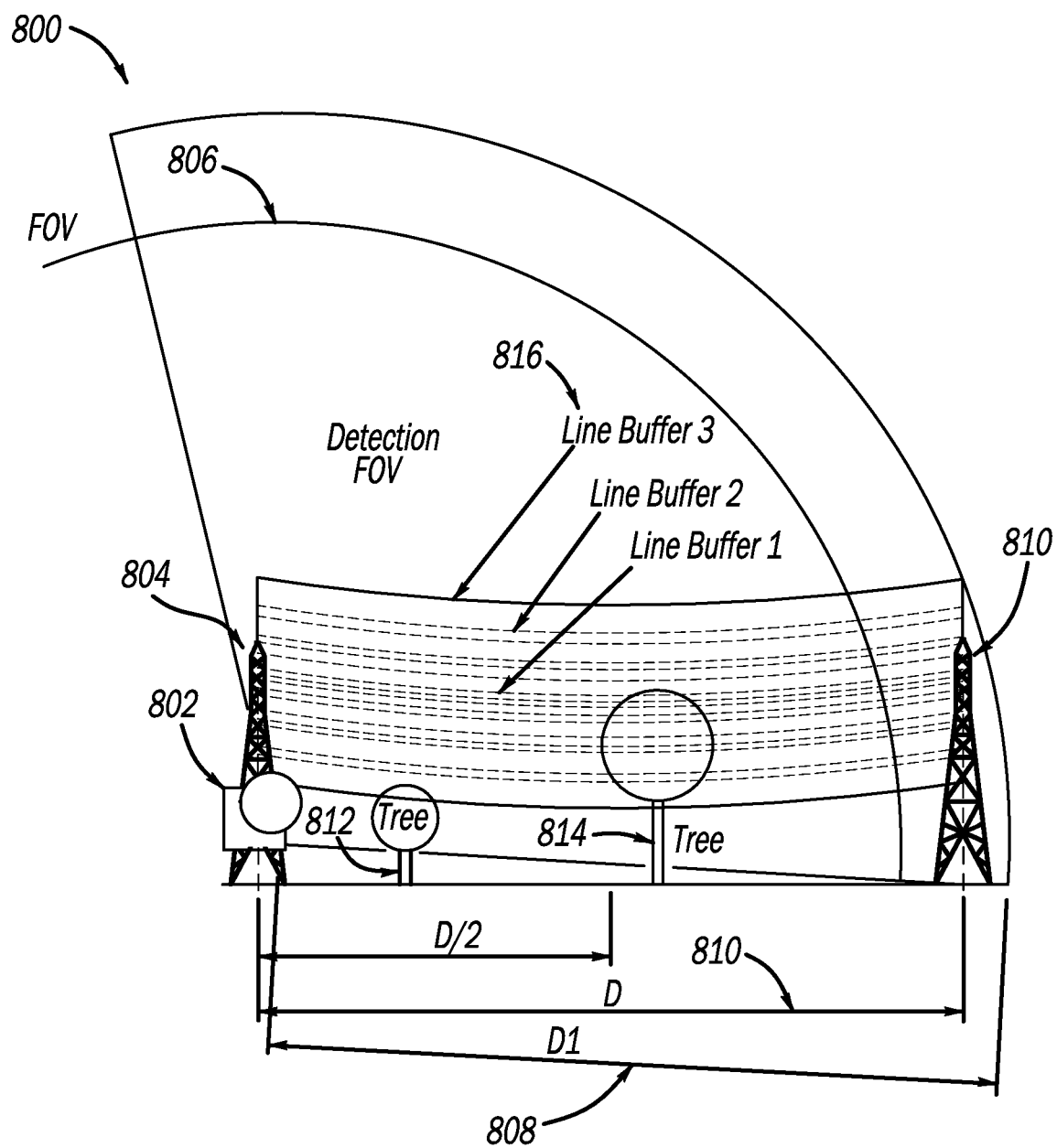
FIG. 8 illustrates a side view of the single sensor package per span-based detection range and field of view in accordance with the present invention.

Directing attention to FIG. 8, an embodiment of the current invention wherein a single sensor package per span with full span coverage, 800 is shown. In one embodiment a single sensor package, 802 is installed on a transmission tower, 804 with a FOV, 806 and range, 808 equals to D1 which scans the complete distance to the next tower, 810 equals to D of the span. This single sensor package with fixed or adjustable FOV is able to scan the ground, vegetation, electric lines and towers. The sensor package scans and detects vegetation, 812 and 814 within the sensor FOV, 806. The vegetation is ranked by its proximity to the power lines and 3D cylindrical buffers, 816 around each wire based on the wire voltage. In this embodiment a single sensor package covers the entire span distance to then next tower and additional range to overlap scan coverage by the sensor package on the subsequent tower. In this embodiment a single sensor package per tower provides 100% coverage of the electric wires, towers, terrain and vegetation in a span.

Figure 9:
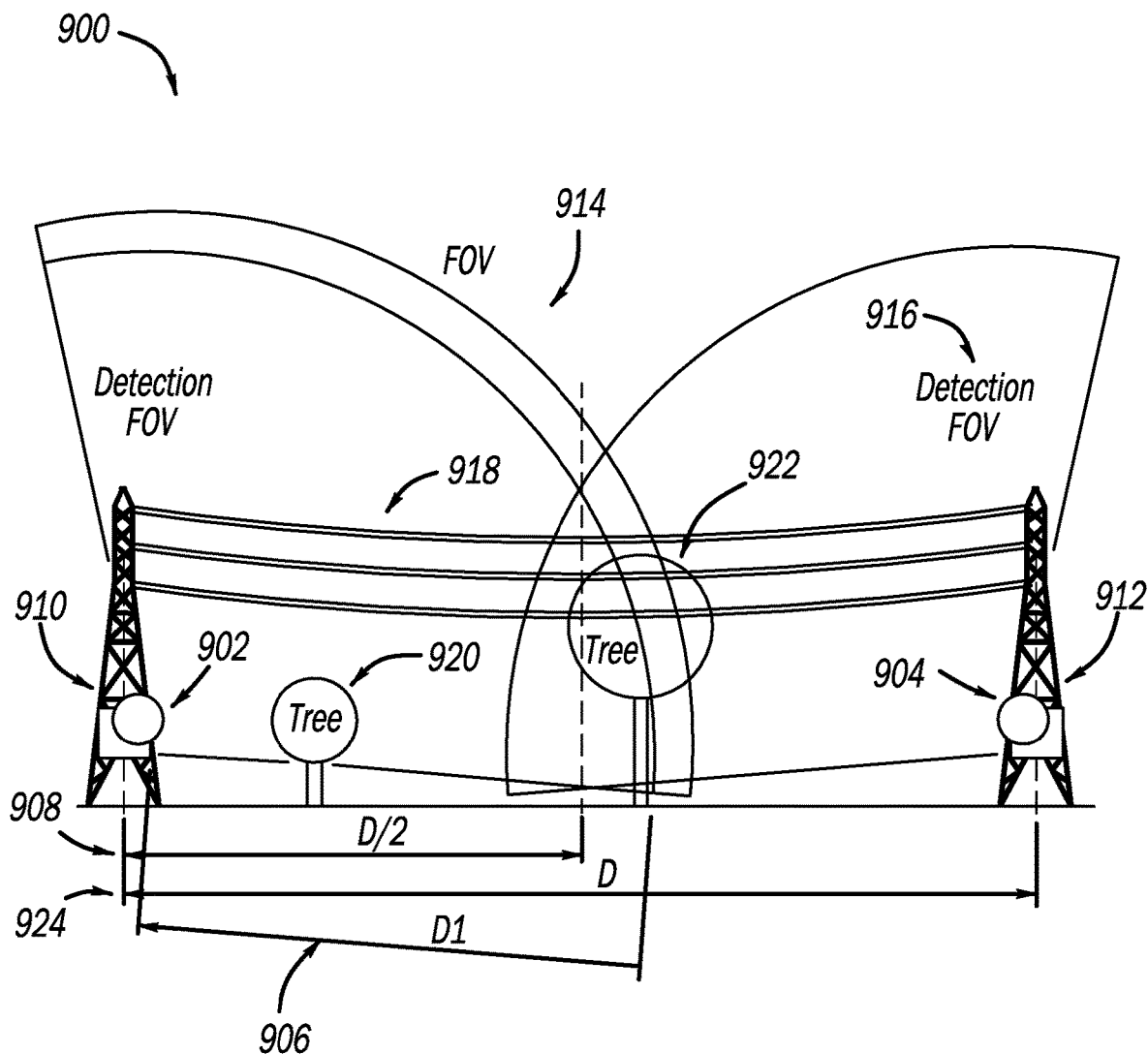
FIG. 9 illustrates a side view of the two sensor packages per span-based detection range and field of view in accordance with the present invention.

Directing attention to FIG. 9, an embodiment of the current invention wherein a dual sensor package per span with full span coverage, 900 is shown. In this embodiment a dual sensor package, 902 and 904 has the range, 906 equals to D1 which is slightly greater than the mid span distance, 908 equals to D/2 are installed on tower, 910 and 912, respectively. Each sensor package has overlapping FOV, 914 and 916 to provide 100% coverage of the electric lines, 918, structures, terrain and vegetation, 920 and 922 in the span, 924 equals to D. This design requires two sensor packages per tower to be installed to cover subsequent spans.

Figure 10:
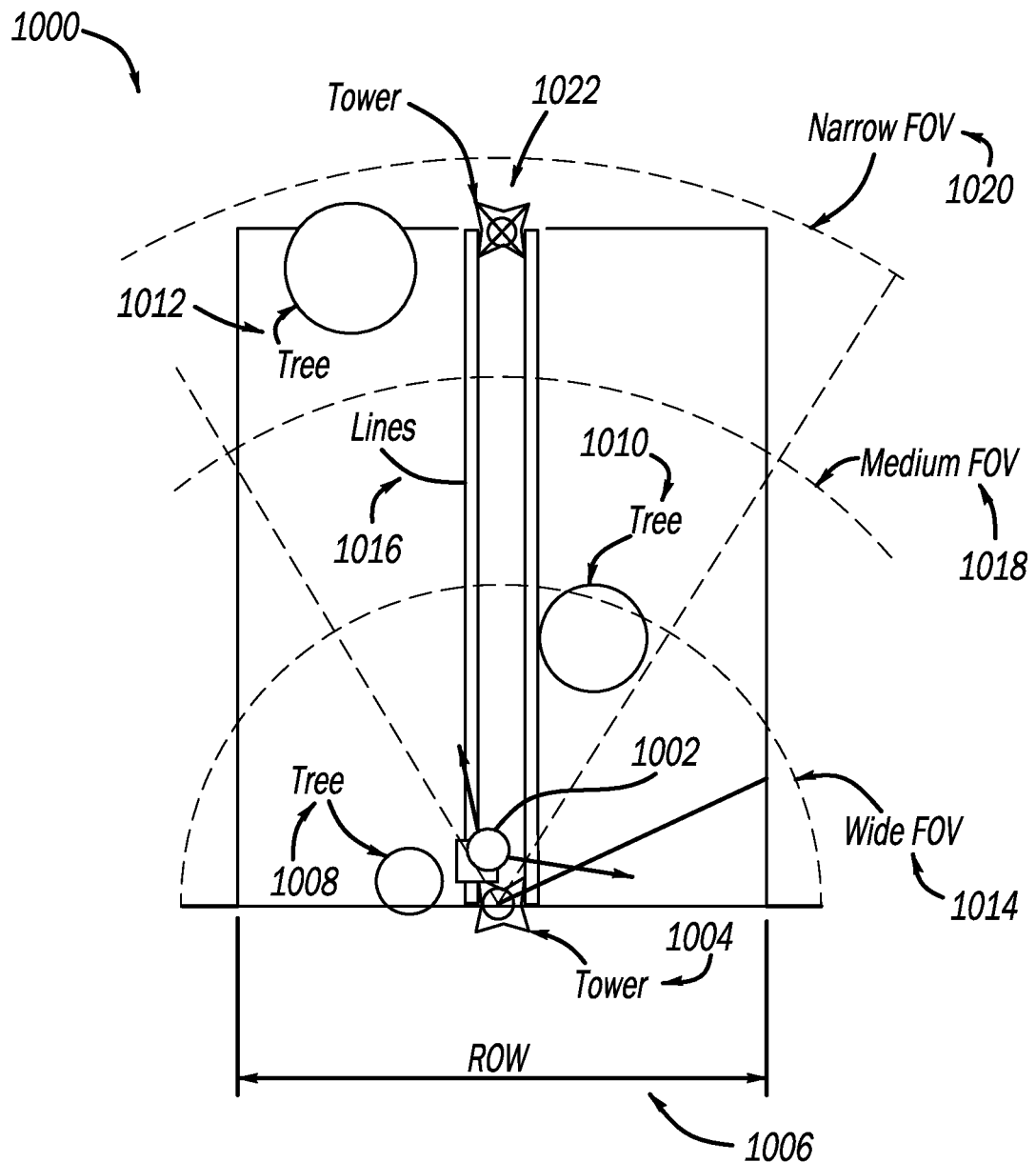
FIG. 10 illustrates a top view of the one sensor package per span-based detection range and field of views in accordance with the present invention.

Directing attention to FIG. 10, an embodiment of the current invention wherein a bird's eye view of a single sensor with adjustable FOV per span with full span coverage, 1000 is shown. In this embodiment, a sensor package, 1002 is installed on tower, 1004 which can use an adjustable FOV to scan the entire footprint of the span ROW, 1006. The sensor package with adjustable FOV can be combined with the previously described embodiments with single or multiple sensor packages per span. When the sensor package scans the span, the sensor automatically collects data and scans the area for each FOV setting. The FOV settings provide overlap to ensure 100% coverage of the ROW in the span to scan the nearby vegetation, 1008, medium distant vegetation, 1010 and distant vegetation, 1012 within the ROW of the span. In this embodiment the sensor automatically collects imagery data with a wide FOV, 1014 which captures the nearby ground and vegetation, 1008 and power lines 1016, a medium FOV, 1018 which scans the power lines, 1016, and intermediate distant vegetation, 1010 and a narrow FOV, 1020 which scans the power lines, 1016 and terrain and vegetation past the next tower, 1022. This variable FOV sensors allow for high resolution and accuracy for both nearby and distant scans within a span.

Figure 11:
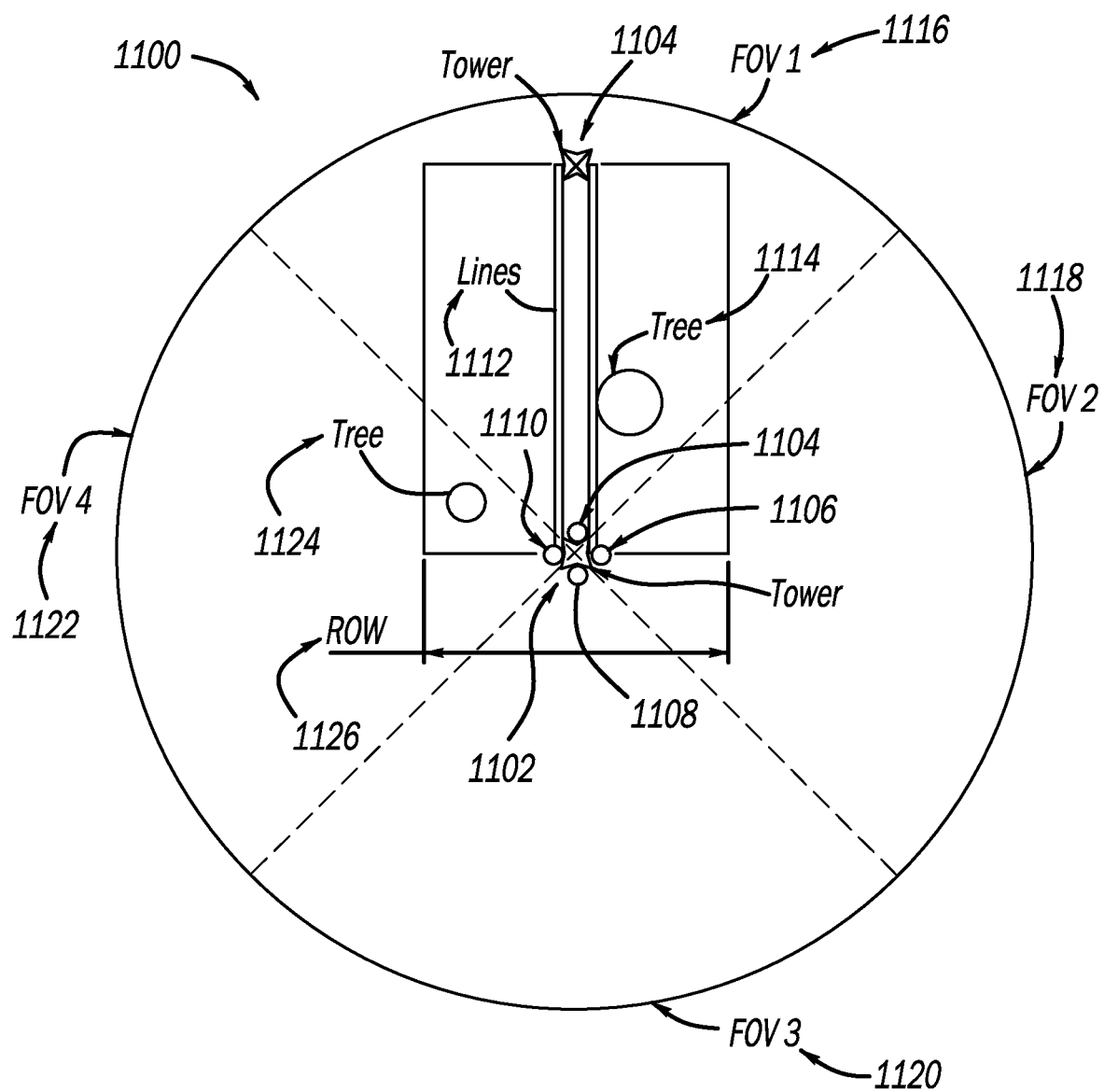
FIG. 11 illustrates a top view of the multiple sensor packages per tower in span-based detection range and field of views in accordance with the present invention.

Directing attention to FIG. 11, in this embodiment wherein 4 sensor packages per tower are used to provide 100% coverage of the ROW and beyond for a span is shown in the bird's eye view, 1100. The transmission tower or power pole, 1102 has 4 sensors, 1104, 1106, 1108 and 1110 installed such that each sensor's FOV covers a portion of the ROW and beyond. Sensor, 1104 scans the area parallel with the span and scans power lines, 1112 and vegetation, 1114 within sensor FOV, 1116. Sensor, 1106 scans the area to the right side of the transmission tower, 1102 within FOV, 1118. The sensor, 1106 FOV, 1118 may be adjacent or overlapping with sensor, 1108 and sensor, 1108 FOVs. The sensor, 1108 FOV, 1120 scans in parallel with the span facing the opposite direction as sensor, 1104. Sensor, 1110 FOV, 1122 completes the coverage with adjacent or overlapping coverage with sensors, 1104 and 1108. Here a tree, 1124 which is in close proximity to the transmission tower, 1102 is not in the FOV of sensor, 1104 but is captured by the scan of the sensor, 1110 with a FOV, 1122 to the left side of the transmission tower, 1102. This embodiment may be combined with other previously described embodiments to optimize the system of sensor packages for a given electric ROW, 1126 and spans to provide 100% coverage for vegetation encroachment detection requirements with no blind spots.

Figure 12:
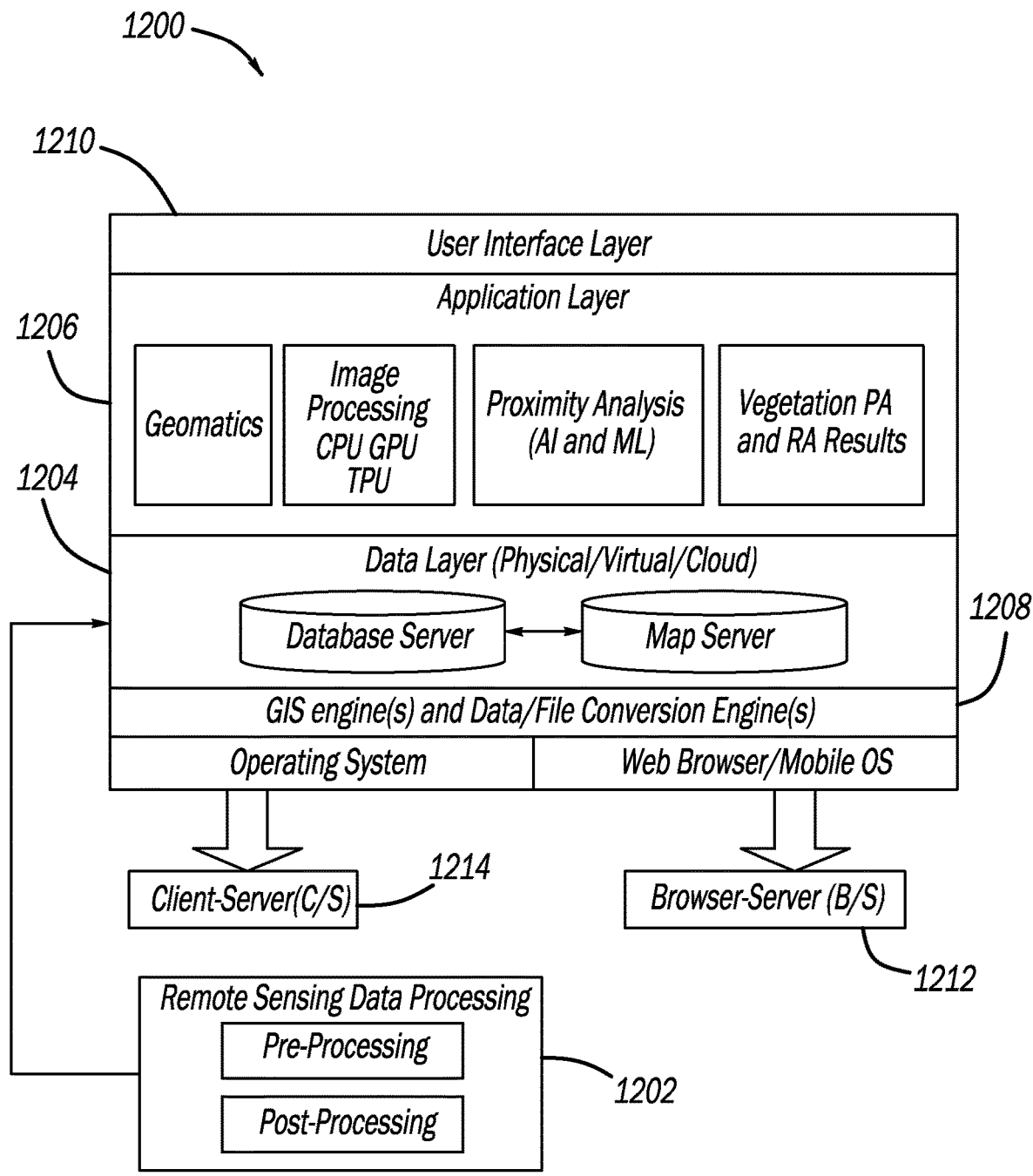
FIG. 12 illustrates a diagrammatic representation of the remote sensing and computing environment and user interface to implement one of the embodiments of the present invention.

Directing attention to FIG. 12, the diagrammatic representation of the sensing, processing, computing and reporting environment and user interface to implement the embodiments of the present invention, 1200 is shown. The sensor package layer, 1202 is the data and image collection process which feeds data to the data layer, 1204. The application layer, 1206 using a combination of proprietary artificial intelligence algorithms, scripts, and off-the-shelf software and central processing unit (CPU), graphics processing unit (GPU) and tensor processing unit (TPU) hardware, processes the data and images, calculates location and dimensions of vegetation, power lines and structures and calculate the vegetation proximity to electric lines based on pre-defined MVCD thresholds. The data product of this application layer is the proximity and resolution for each vegetation. This results are sent to the data layer, 1204. The VPA and VRA results with location, dimension and meta data are stored in the database. Each time a new observation/scan is completed for a span, the most recent results are stored and the previous results are stored for a period of time to allow for the changes to be tracked for the period of time intervals. The geographic information system (GIS) engine and data file conversion engine, 1208 extracts data on request from the users through the user interface layer, 1210. These users may use the extracted data while having access to the internet or may choose to download the data to a mobile device for use in the field through server layer, 1212. Users select areas of power lines, spans, or towers by ID or name or by drawing a polygon on an interactive map using the client server, 1214.

Given these embodiments a skilled person in the art will realize many possible optional and combinational embodiments to optimize the type of sensor packages, installation locations, fields of view, scan range, coverage based on variations in the number of conductors in a power line corridor, the design of the transmission towers or power poles, length of spans and the type of vegetation and proximity detection requirements based on MVCD requirements.

What is claimed is:

1. A monitoring system comprising:
   (a) multiple, spaced apart utility structures;
   (b) a high voltage, electrical power line spanning across an area between the utility structures and being adjacent vegetation, the power line being attached to the utility structures;
   (c) a camera attached to one of the utility structures, the camera capturing image data of the area between the utility structures adjacent to the electrical power line, the image data including the vegetation;
   (d) a processing unit and a server:
      (i) obtaining the image data from the camera; and
      (ii) determining whether a potential hazard exists in the area between the utility structures;
   (e) a communicator notifying a remote receiver of a need for a remedial action pertaining to the potential hazard, based on the determination by the processing unit; and
   (f) the communicator transmitting locational data of the potential hazard to the remote receiver.

2. The system of claim 1, wherein the camera has an adjustable field of view including a narrow field of view, a medium field of view, and a wide field of view, each of the fields of view at least partially overlap, and further comprising a second camera on a second of the utility structures, the second camera having multiple fields of view.

3. The system of claim 1, wherein:
   the processing unit is part of a cloud computer remote from the camera;
   the cloud computer obtains, via a wireless connection, the image data from the camera; and
   the processing unit generates a model of the area adjacent to the electrical power line, based on the image data, the model assisting in the potential hazard determination.

4. The system of claim 1, further comprising multiple sensors attached to the one of the utility structures, the multiple sensors including the camera, and all of the sensors transmitting data to the server, and the sensors are stationary without aircraft sensing of the vegetation and the potential hazard.

5. The system of claim 1, wherein the potentially hazardous condition is a fire or flashover, and the power line being configured to carry high voltage of at least 4 kV.

6. The system of claim 5, wherein the camera is stationary and the processing unit automatically monitors the potential hazard in the area, the utility structures being at least one of: a pole or tower.

7. The system of claim 1, wherein current and historical results of the data are transmitted to the server and are used in the potential hazard determination, and the processing unit uses machine learning and artificial intelligence in the potential hazard determination.

8. The system of claim 1, wherein the image data is used to automatically determine whether an environmental encroachment of the vegetation relative to the power line poses the potential hazard.

9. A monitoring system comprising:
   (a) multiple, spaced apart utility structures;
   (b) an electrical power line spanning between the utility structures and being adjacent vegetation;
   (c) cameras mounted to the utility structures, the cameras creating digital images of the electrical power line and vegetation with different, adjustable and overlapping fields of view, the images scanning an area of the vegetation between the utility structures;
   (d) sensors mounted to at least some of the utility structures configured to sense weather data;
   (e) a processing unit, the cameras and the sensors sending the images and the weather data to the processing unit;
   (f) the processing unit automatically storing recent and previous images to automatically track changes;
   (g) current and historical analysis results from the automatically tracked changes being sent to a remote user; and
   (h) location coordinates of the cameras being sent to the remote user when a wildfire or flashover at the vegetation is automatically detected by the processing unit.

10. The system of claim 9, wherein the camera has an adjustable field of view including a narrow field of view, a medium field of view, and a wide field of view, each of the fields of view at least partially overlap, and further comprising a second camera on a second of the utility structures, the second camera having multiple fields of view.

11. The system of claim 9, wherein:
cloud data storage located remote from the camera;
the processing unit is remotely located from the cameras and the utility structures; and
the processing unit obtains, via a wireless connection, the image data from the camera; and
the sensors and the cameras are stationary without aircraft sensing of the vegetation areas.

12. The system of claim 9, wherein the processing unit and a data storage are onsite with the camera, mounted to the one of the utility structures which includes at least one of: a pole or a tower, and a second camera and second processing unit mounted to a second of the utility structures.

13. The system of claim 9, further comprising multiple sensors attached to the one of the utility structures, the multiple sensors including the camera, and all of the sensors transmitting data to the server.

14. The system of claim 9, wherein the potentially hazardous condition is a wildfire or flashover.

15. The system of claim 9, wherein the cameras are stationary and the processing unit automatically monitors the potential hazard in the area.

16. The system of claim 9, wherein current and historical results of the data are transmitted to the server and are used in the potential hazard determination, and the processing unit uses machine learning and artificial intelligence in the potential hazard determination.

17. The system of claim 9, wherein the image data is used to automatically determine whether an environmental encroachment of the vegetation relative to the power line poses the potential hazard.

18. A monitoring system comprising:
(a) multiple, spaced apart structures each comprising at least one of: a pole or a tower;
(b) cameras mounted to at least some of the structures, the cameras continuously creating scanned images of vegetation with different and overlapping fields of view, without aircraft-based camera monitoring of the vegetation;
(c) sensors mounted to at least some of the structures configured to sense weather data;
(d) a data processor remotely located from the cameras and the structures, the cameras and the sensors configured to send the images and the weather data to the data processor in real time;
(e) the data processor automatically storing recent and previous of the images to automatically track changes;
(f) current and historical analysis results from the automatically tracked changes operably being sent to a remote receiver;
(g) location coordinates of the cameras operably being sent to the remote receiver; and
(h) an advisory and map being automatically sent by the data processor to the remote receiver if an undesirable condition exists based on the analysis results.

19. The system of claim 18, wherein the cameras each have an adjustable field of view including a narrow field of view, a medium field of view, and a wide field of view, each of the fields of view at least partially overlap.

20. The system of claim 18, wherein:
cloud data storage located remote from the camera;
the data processor is remotely located from the cameras and the structures; and
the processing unit obtains, via a wireless connection, the images from the cameras.

21. The system of claim 18, further comprising a data storage located onsite with each of the cameras to store the images, the data storage being mounted to an associated one of the structures.

22. The system of claim 18, further comprising multiple sensors attached to a first and a second of the structures, the multiple sensors including the camera, and an at least 4 kV power line spanning between the first and the second of the structures with vegetation adjacent the power line.

23. The system of claim 18, wherein the undesirable condition is a wildfire or flashover.

24. The system of claim 18, further comprising power lines spanning between the structures which are high voltage transmission towers, the cameras are stationary, and the images from the cameras include the vegetation and the power lines.

25. The system of claim 18, further comprising a server in communication with the data processor which is a central processing unit, the images and the weather data being transmitted to the server, and the central processing unit using machine learning and artificial intelligence in the undesirable condition determination.

26. The system of claim 18, further comprising a high voltage power transmission line spanning between the structures, and the images being used by the data processor to automatically determine whether an environmental encroachment of the vegetation relative to the power transmission line poses the undesirable condition.

27. A monitoring system comprising:
(a) multiple, spaced apart and stationary structures each comprising at least one of: a pole or a tower;
(b) cameras mounted to at least some of the structures, the cameras creating scanned images of vegetation area with different and overlapping fields of view, at least one of the fields of view being greater than 90 degrees, and at least another of the fields of view being narrower and less than 90 degrees;
(c) a server receiving the images;
(d) a processing unit receiving the images in real time;
(e) the processing unit automatically storing recent and previous of the images to automatically track changes;
(f) the vegetation areas being assigned unique identifiers associated with location data; and
(g) a remote receiver, the processing unit being configured to automatically send the locational data and the identifier of at least one of the vegetation areas to the remote receiver when a wildfire or flashover is automatically detected by the processing unit therein, and without an aircraft-based camera.

28. The system of claim 27, further comprising an advisory and map being automatically sent by the processing unit to the remote receiver if the undesirable condition is detected.

29. The system of claim 27, further comprising a high voltage power distribution line spanning between the structures which include the towers, and the images being used by the processing unit to automatically determine whether an environmental encroachment of the vegetation relative to the power distribution line poses a fire hazard.

30. The system of claim 27, wherein the cameras are stationary and each have an adjustable field of view including a narrow field of view, a medium field of view, and a wide field of view, each of the fields of view at least partially overlap.

* * * * *